United States Patent [19]

Kim

[11] Patent Number: 5,632,210

[45] Date of Patent: May 27, 1997

[54] HIGH TEMPERATURE INCINERATOR FOR BIO-ACTIVE SOLID WASTES

[76] Inventor: Dae S. Kim, 49 Floral St., Newton, Mass. 02161

[21] Appl. No.: 369,656

[22] Filed: Jan. 6, 1995

[51] Int. Cl.$^6$ .................. F23N 5/18; F23J 15/00; F23G 7/04

[52] U.S. Cl. .................. 110/186; 110/203; 110/238; 110/254

[58] Field of Search .................. 110/206, 207, 110/203, 235, 229, 254, 238, 215, 185, 186

[56] References Cited

U.S. PATENT DOCUMENTS

| | | | |
|---|---|---|---|
| 4,232,614 | 11/1980 | Fitch et al. | 110/238 X |
| 4,299,561 | 11/1981 | Stokes | 110/254 X |
| 4,665,841 | 5/1987 | Kish | 110/229 X |

*Primary Examiner*—Henry A. Bennett
*Assistant Examiner*—Susanne C. Tinker

[57] ABSTRACT

This invention incinerates bio-active, or any solid wastes with high organic contents and a major recoverable liquid component, at an extremely high temperature with minimum added fuel, air pollution, space, time and labor. This invention removes the liquid components through a separate route from the combustion zone, maintains a very high incineration temperature for a complete oxidation of dried solid by minimizing the exhaust gas volume, excess combustion air, the exit exhaust gas temperature and the heat loss with a use of a matched pair of high-temperature ceramic heat recuperators which have very large surface area per mass.

9 Claims, 1 Drawing Sheet

HIGH TEMPERATURE INCINERATOR FOR BIO-ACTIVE SOLID WASTES

BACKGROUND OF THE INVENTION

1. Field of Invention

The present invention relates to an incinerator for solid wastes and in particular to a compact high temperature incinerator for bio-active solid waste with a counter-current heat recovery/transfer and a separate moisture removal.

2. Description of the Prior Art

Most prior art incinerators, for household wastes or bio-active solid wastes which has a large amount of bound and free moisture, have a large combustion chamber and a burner which supply additional heat to burn the wastes. The moisture is removed with other gaseous combustion products.

In these prior art devices, the temperature of combustion and rate of throughput are low. A large amount of unburnt wastes drops through a grating with ash and is disposed in landfill. The exhaust contains fly-ash and other air pollutants, such as Dioxin, NOx, and incomplete combustion products, which affect the surrounding area. Resulting strong public objections, known as not-in-my-back-yard or NIMBY, put most of the incinerators out of service except large ones with a well integrated air pollution abatement system. To make these large incinerators more economically attractive, the wastes are pre-sorted to increase their heating value and steam and power are generated as by-products.

More recently, cement kiln type, long-path incinerators are used to improve thermal efficiency of the added fuel. A rotating counter-current contact between the exhaust gas and the waste stream increases the temperature of the combustion, promotes the oxidation reaction and reduces the ash. To improve the thermal efficiency further, preheaters and heat recuperators are added. Although these are very popular in the catalytic or purely thermal oxidation of low concentration volatile organic chemicals (VOC), they are not widely used for household or medical wastes as they have a large amount of water and ash.

For a disposal of bio-active solid wastes, existing legal requirements make in-house incineration economically prohibitive. A contractor collects the wastes, sterilizes them in an autoclave, sorts and ships them to unpopulated areas for incineration and landfill. Sometimes, the wastes are lost overboard, wash up on beaches and cause hazard to bathers. This multiple handling of bio-active wastes wastes money, energy, and human effort and is dangerous.

DISCLOSURE OF THE INVENTION

The present invention incinerates bioactive or common household wastes at an extremely high temperature with minimum added fuel, air pollution, ash, space, time and labor. This invention provides an efficient combustion of the solid wastes with a large amount of free and bound moisture by removing all of the moisture before the solids reach the high temperature combustion zone. Similarly, this invention can incinerate any solid wastes with a high organic content and major recoverable liquid components by providing a separate route for the removal of the liquid from the high temperature zone.

The high incineration temperature is maintained by maximizing the preheated combustion air temperature and minimizing the exit exhaust gas temperature, the exhaust gas volume and the heat loss.

This invention uses 1) a pair of substantially identical heat recuperators, one for preheating the combustion air and the other for capturing the sensible heat of the exhaust gas, alternately; 2) a vertical, insulated waste chamber for holding the solid wastes in the upper section, dehydrating the wastes progressively as the wastes travel down to a combustion zone where the dried solids are burnt by contacting the hot air flow from the preheating recuperator, sending the hot exhaust gas to the other recuperator, and providing a movable space for ash and an opening which is used to remove the ash and supply the start-up heat at the bottom; 3) an air/exhaust handler which has a blower for maintaining the flow of both the air and the exhaust and keeping the whole system under a slight vacuum for a safer containment of the heat and the gas, a four-way valve for reversing the flow and connecting ducts; and 4) a separate moisture remover which has a water reservoir, a dip leg, a condenser, a noncondensable gas return line, demistor and connecting pipes; 5) sensors, controls, a start-up air/fuel mixture supply and an igniter.

To start, the air/fuel mixture with the igniter are introduced temporarily to the combustion zone through the opening for ash removal and is ignited.

The combustion zone and the first recuperator are heated until about top ten percent of its heat storage element reaches a preset temperature as the exhaust blower pull the hot exhaust gas downward through the first recuperator while a slight vacuum is maintained throughout the system by closing the intake port. The second recuperator is heated by changing the direction of the exhaust flow. When the top of the heat storage element of the second recuperator reaches the start up combustion temperature, the temporary heat supply system is removed and replaced with an insulating plug.

To incinerate, solid wastes, in a plastic bag or canister, are charged into the chamber from the top and the lid is closed. When the preheated air from the first recuperator heats the wastes in the hot combustion zone, a part of moisture is carried away by the exhaust stream to the second recuperator but the remainder will rise upward through the wastes. In fact, the column of solid wastes acts as if it is a multi-plate distillation tower. The reflux washes down the water soluble wastes continuously towards the combustion zone. The water vapor and the non-condensable gas move up toward the top and out to a condenser. This gas stream is composed of mainly water vapor as it is the most abundant and the lightest component. A demister knocks out the entrained water droplets at the top of the condenser. The condensed water in the dip leg maintains the vacuum and the surplus water is removed from the dip pan. The non-condensing gas is returned to the combustion zone and burned.

To maintain the high combustion temperature and the low exit exhaust gas temperature, the axial temperature profiles of the air, the exhaust and the recuperators must be nearly identical and also the recuperator must have very large surface area per mass and withstand the high temperature. Corning's Celcor ceramic honeycombs, which are widely used for catalyst support, are available. In the future, the incineration temperature can be raised to near the adiabatic flame temperature of the start-up fuel or even higher when such a high temperature refractory heat storage element becomes commercially available.

In a transient heat transfer process between a periodically reversing gas flow and a stationary solids with very large surface area per mass, their axial temperature profiles are very similar and have typically flat hot end, flat cool end and a sharp drop in the middle where most of the heat is transferred. The flat temperature levels represent the near saturation (or equilibration) and are almost the temperatures of gas entering at each end. At a given gas flow rate and inlet temperature, the profile only shifts away from the inlet as more gas passes. The transferred heat is stored as the sensible heat by raising the solid temperature. To control the combustion reaction, pairs of temperature and oxygen sensors are placed above the hot ends of the both recuperator elements. When the excess oxygen in the exhaust stream from the combustion falls below a preset level, the amount of the wastes in the combustion zone is reduced and replaced with ash by controlling the ash level. Whenever the temperature of the preheated air drops below the preset point, the gas flow is reversed. A proper level of the wastes is maintained for a continuous drying of the solid wastes. For a continuous charging of solid wastes, the top inlet can be easily sealed with custom designed containers which snugly fit the inlet with a soft seal.

For a continuous and stable operation, the heat from the burning the completely dry solid wastes should be enough to sustain the preset high combustion temperature. For wastes with very high moisture content or very low heating value, however, polyethylene packaging material can provide any additional heat as well as shipping and handling protection. Excess heat can be removed by raising the exhaust gas temperature or by allowing more excess air. The combination of the very high combustion temperature of the completely dry wastes, a controlled excess air and an additional high temperature thermal oxidation by the hot end of the recuperator should eliminate any incomplete combustion product. Also a proper sizing and directing of the hot exhaust gas flow and the passages can prevent ash entrainment to the recuperator.

To prevent clogging of gas passages of the fixed geometry honeycomb by ash, a mildly fluidizable (or loosely packed) bed of refractory solids can be put on the top of the ceramic elements to act as a depth filter for the downward exhaust flow. The entrapped particulates can be easily removed by the upward preheated air flow. The upper bed of this two-zone hybrid recuperator protects the hot end of the ceramic honeycomb from sudden temperature surge.

This incinerator can be automated to a complete computer control. Its high through-put, high energy efficiency and compactness is ideal for mobile applications, such as on a ship or on a pick-up van where the start-up fuel is readily available. Routine removal of the small amount of ash, mainly the metal oxides, through the opening for the start-up heat supply system poses no difficulty. If any additional treatment of the exhaust gas or the condensed water becomes necessary, many well-established technologies are available.

This invention can be easily modified or customize to incinerate or pyrolize other solid wastes, such as tires, which has a major recoverable liquid components by proving means for removing the liquid component separately from the combustion zone as water is removed in the bioactive incineration. The modifications include a self-sealing annular waste chamber, which is adaptable to different rim sizes and outer diameters, and a liquid recovery system which is located in the middle spanning along the entire axis of the waste chamber through the ash holder. An annular ash holder and an annular ash plug-lifter provide room for the the insulated vacuum seal and dip leg for the liquid recovery system. The liquid condensate is drained continuously at the bottom from a dip pan. The ash which is mainly composed of the oxidized steel from the belts and beads is removed from the annular space.

DESCRIPTION OF THE PREFERRED EMBODIMENT

Figure 1:
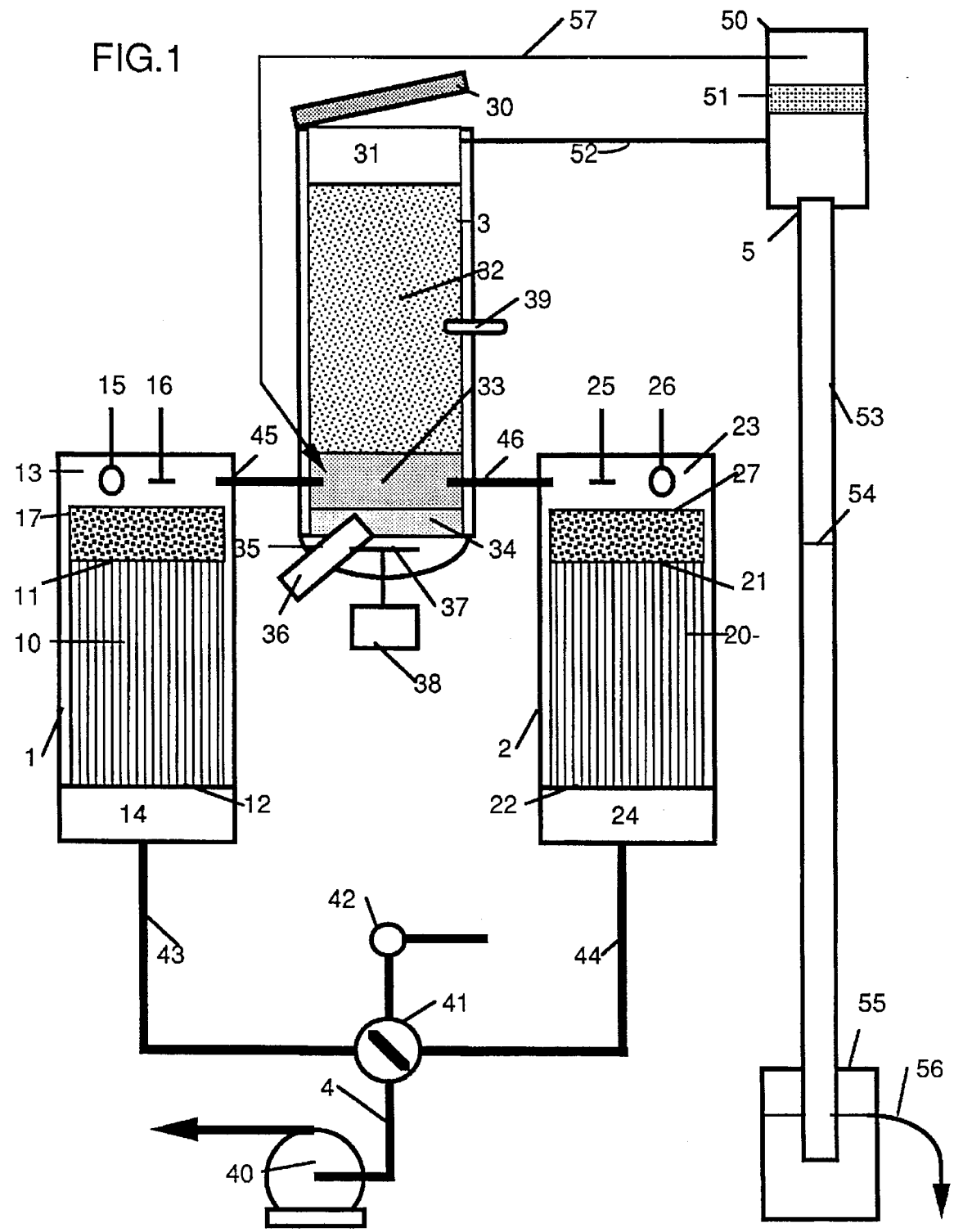
FIG. 1 is a schematic illustration for the inter-relation of components of this invention.

In FIG. 1, this invention consists of a pair of substantially identical heat recuperators 1 and 2, a waste chamber 3, an air/exhaust handler 4 and a moisture remover 5. Both recuperators and the chamber are thermally insulated.

The recuperator 1 has a heat storage/transfer element 10 which has a hot end 11 and a cool end 12, a hot gas plenum 13 with a temperature sensor 15 and an oxygen sensor 16, a cool gas plenum 14 and a bed 17 of loosely packed refractory particles. Similarly, the recuperator 2 has the corresponding components, from 20 to 27.

The chamber 3 has a gas tight cover 30 and a large opening 31 for charging solid wastes at the top, a holding space 32, combustion zone 33, a space for ash 34, an opening 35 for a removable heat supply system 36 for start-up, ash level lifter 37, a lifter controller 38, and a waste level sensor 39 which warns the low level of the wastes. The opening 35 is used to remove ash and is closed with an insulated plug.

The gas handler 4 has a exhaust blower 40, a four-way flow reversing valve 41, an air intake control valve 42, two low temperature connecting ducts 43 and 44 and two insulated high temperature connecting ducts 45 and 46, which must prevent or minimize the entrainment of solids.

The moisture remover 5 has a condenser 50 with a demister 51, a vapor line 52, a dip leg 53 with a risen water level 54 which responds to the system vacuum, a condensate reservoir 55 with a level controlling drain 56, and a pipe 57 which returns the non-condensable gas to the combustion zone 33.

While the above description contains many specificities, these should not be construed as limitations of the scope of the invention, but rather as an exemplifications of one preferred embodiment thereof. Many other variations are possible. Accordingly, the scope of the invention should be determined not by the embodiment illustrated, but by the appended claims and their legal equivalents.

I claim:

1. An incinerator for bio-active solid wastes comprising:
   a. a high temperature combustion zone wherein dry solid components of said wastes are oxidized;
   b. a pair of substantially identical heat recuperators, one for preheating an air stream to a preset high temperature before entering said combustion zone and the other for removing a substantial portion of the sensible heat from the exhaust gas stream leaving said combustion zone, alternately;
   c. means for controlling flow and direction of said air stream and said exhaust gas stream under a slight vacuum;
   d. means for adjustably supplying said solid wastes to said combustion zone;
   e. means for progressively removing the volatile component from said solid wastes away from said combustion zone and said exhaust stream;
   f. means for heating said combustion zone and said recuperators for start-up;
   g. means for removing ashes from said exhaust gas stream and said combustion zone; and h. means for monitoring said preset temperature and the Oxygen level in said exhaust gas stream.

2. The incinerator of claim 1 wherein said high temperature combustion zone is the middle part of a vertical insulated waste holding chamber which is connected to the hot ends of both said heat recuperators.

3. The incinerator of claim 1 wherein said means for controlling flow and direction includes an exhaust blower, a four-way reversing flow valve, an intake valve, a pair of insulated ducts between said combustion zone and said pair of heat recuperators.

4. The incinerator of claim 3 wherein said means for supplying said solid waste is a cylindrical upper portion of said waste holder, an air tight lid, a wastes level sensor and an ash level control at the bottom.

5. The incinerator of claim 4 wherein said means for progressively removing include a vertical column of loosely packed solid wastes in said waste holding chamber, a condenser, a demister, a dip leg, a dip pan, water drain, and a return line for non-condensable gases.

6. The incinerator of claim 5 wherein said means for removing ashes includes an opening on the bottom of said waste holding chamber and a bed of loosely packed refractory particles on both said recuperators.

7. The incinerator of claim 6 wherein said means for heating for startup includes a removable air and fuel supply with an igniter which can be inserted into said opening.

8. The incinerator of claim 6 wherein said means for monitoring includes a set of oxygen and temperature sensors which are located near said hot end of said recuperators.

9. An incinerator for solid wastes with a high organic contents and a major recoverable liquid component comprising:

a. high temperature combustion zone;

b. a pair of substantially identical heat recuperators, which have a large surface for heat transfer per mass, one for preheating an air stream to a preset high temperature before entering said combustion zone and the other for removing a substantial portion of the sensible heat from the exhaust gas stream leaving said combustion zone, alternately;

c. means for controlling flow and direction of said air stream and exhaust gas stream under a slight vacuum;

d. means for adjustably supplying said solid wastes to said combustion zone;

e. means for removing said recoverable liquid components away from said combustion zone and from said exhaust gas stream;

f. means for heating said combustion zone for start-up;

g. means for removing ashes from the exhaust gas stream and said combustion zone; and h. means for monitoring said preset temperature and the oxygen level in said exhaust gas stream.

* * * * *